Oct. 23, 1956  W. R. AKANS  2,767,949
ADJUSTABLE LEG CONNECTION
Filed July 20, 1953  2 Sheets-Sheet 1
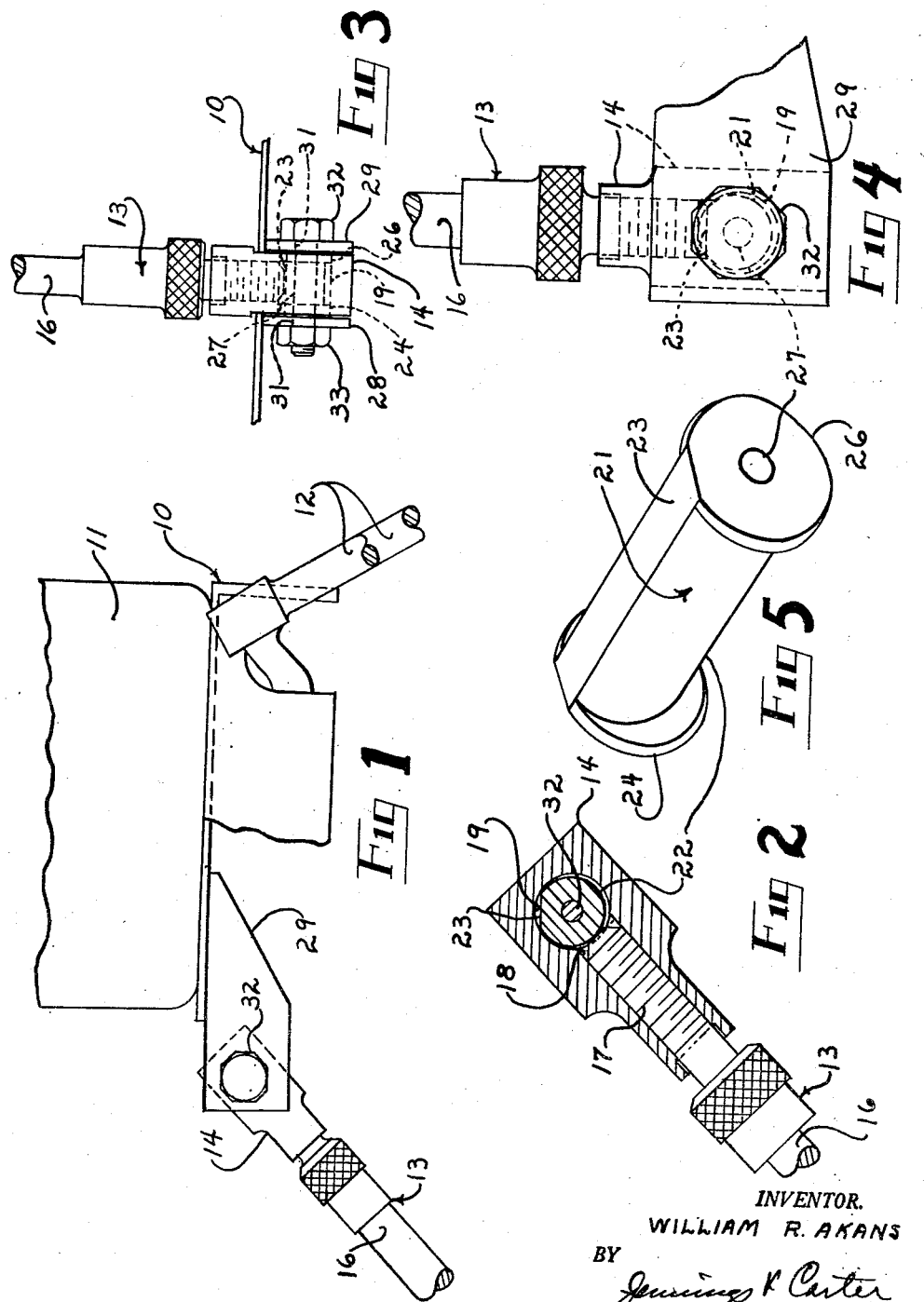
INVENTOR.
WILLIAM R. AKANS
BY
Jennings & Carter
ATTORNEYS

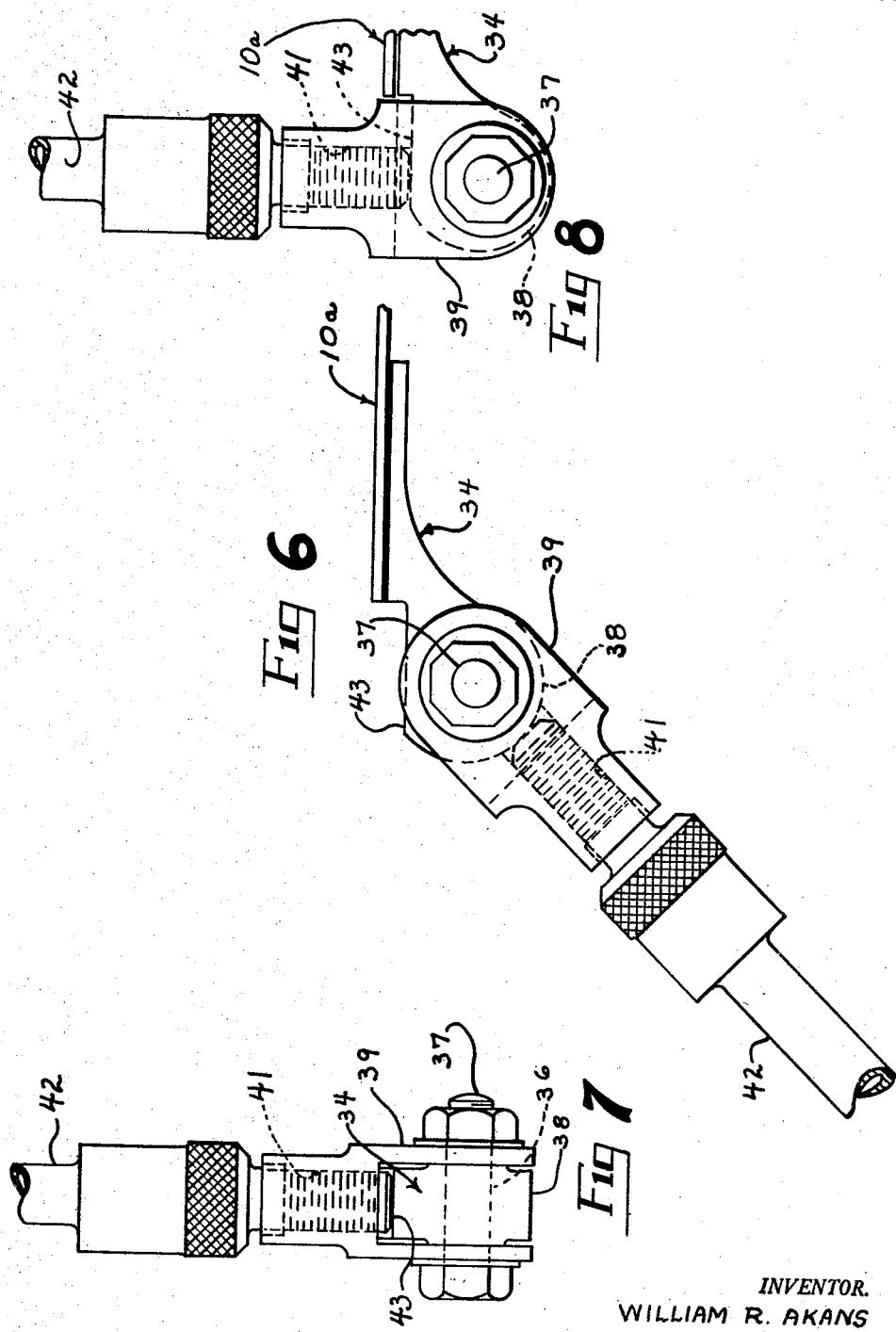

United States Patent Office 2,767,949
Patented Oct. 23, 1956

2,767,949

ADJUSTABLE LEG CONNECTION

William R. Akans, Birmingham, Ala.

Application July 20, 1953, Serial No. 368,884

5 Claims. (Cl. 248—188)

This invention relates to the supporting legs for various devices and has especial application to tripods and the like, and has for an object the provision of an adjustable leg including a locking device which shall permit movement of the leg in one direction only whereby the angle of the device supported may be quickly and readily adjusted and locked in any set position.

A more specific object of my invention is to provide a lock for the legs of tripods and the like which shall include a cam member at the pivot point of a leg against which the inner end of the leg is adapted to bear together with means for adjusting the position of the adjacent end of the leg relative to the cam member.

A further object of my invention is to provide a lock of the character designated which shall be simple in construction, economical to manufacture and one which is adapted to hold a tripod leg in any set position without liability of slippage.

As is well known in the art to which my invention relates, difficulties have been encountered in the adjustment of tripod legs due to the fact that the leg being adjusted collapses upon loosening its adjusting screw. To overcome these and other difficulties, I have devised a lock member which retains the leg against movement in one direction thus holding the tripod in a partly raised position, and yet permits free movement of the leg in the opposite direction. By providing such a lock member the leg may be adjusted to any desired position and locked in its new position without loosening a screw.

Briefly my improved lock mechanism comprises a cam member secured to the tripod and having an involute shaped outer surface. Pivotally connected to the tripod adjacent the cam member is the upper section of a leg having an adjustable lower section which is disposed to engage the involute shaped surface on the cam member whereby the leg is free to swing in a direction to move the upper end of the adjustable lower section toward a reducing radius on the cam member. To lock the leg in selected positions the adjustable lower section of the leg is moved inwardly toward the cam member.

Apparatus embodying features of my invention is illustrated in the accompanying drawings forming a part of this application in which:

Fig. 1 is a side elevational view showing the locking mechanism associated with a camera tripod;

Fig. 2 is an enlarged side elevational view partly broken away and in sections;

Fig. 3 is an end view, showing the tripod leg locked in a vertical position;

Fig. 4 is a side elevational view of the device in the position shown in Fig. 3;

Fig. 5 is a perspective view of the cam member employed;

Fig. 6 is a side elevational view showing a modified form of locking mechanism;

Fig. 7 is an end view of the locking mechanism shown in Fig. 6 showing the leg in vertical position;

Fig. 8 is a side elevational view of the locking mechanism shown in Fig. 6 showing the leg in vertical position.

Referring now to the drawings for a better understanding of my invention I show a tripod 10 adapted to support a suitable object such as a camera indicated generally at 11. While I do not desire to be limited to any specific type of supporting leg, I find that my locking mechanism is particularly adapted for use on collapsible camera tripods, such as described and claimed in my Patent No. 2,627,386, issued February 3, 1953. The tripod 10 is provided with the usual pair of front legs 12 and a rear leg 13 which latter is comprised of an upper section 14 and a lower section 16. The upper end of the lower section 16 is threaded externally as at 17 and the upper section 14 is provided with a downwardly extending internally threaded sleeve portion 18 for receiving the threaded end 17, thus connecting the upper and lower sections whereby they may be adjusted relative to each other. The upper section 14 of the leg 13 is provided with a transverse opening 19 which extends substantially normal to and communicates with the sleeve portion 18.

Fitting slidably within the opening 19 is a cam member 21 having an involute shaped outer surface with a reduced radius at one side thereof as at 22. The opposite side of the cam member 21 is provided with a substantially flat portion 23 for a purpose to be described hereinafter. Circular flange members 24 and 26 are provided at opposite ends of the cam member 21. These flanges engage the inner surface of the opening 19 with a sliding fit thus permitting the leg 13 to rotate about the cam member 21. An opening 27 is provided in the cam member 21 and is substantially concentric with the transverse opening 19 in the upper leg section 14.

Secured to and extending rearwardly of the tripod 10 is a pair of spaced brackets 28 and 29 having transverse openings 31 therein. The upper section 14 of the leg 13 is positioned between the brackets 28 and 29 and is pivotally connected thereto by means of a bolt 32 which extends through the opening 27 in the cam member 21 and the transverse openings 31, and is held in position by means of a nut 33. As shown in Fig. 3, the cam member 21 is slightly longer than the width of the upper section 14 so that when the nut 33 is tightened the cam member is held against rotation. The width of the upper section 14 is slightly less than the distance between the brackets 28 and 29, thus permitting the leg 13 to swing freely therebetween.

The cam member 21 is positioned between the brackets 28 and 29 so that the flat surface 23 is at the top thereof and with the upper end of the lower section 16 adjacent the cam surface. With the upper section 14 and the lower section 16 of the leg 13 adjusted to the position shown in Fig. 2 of the drawings, the lower end of the leg 13 may be swung downwardly toward a vertical position but cannot be swung upwardly because the upper end of the lower section 16 would bear against the longer radius portion of the cam member 21. The leg 13 may be locked in any adjusted position by screwing the upper end of the lower section 16 into the sleeve portion 18 until it engages the cam member 21. When it is desired to lock the leg 13 in a vertical position as shown in Figs. 3 and 4, the lower section 16 is loosened with respect to the cam member 21. The leg 13 is then moved to the vertical position shown and the lower section 16 thereof is again screwed into engagement with the flat surface 23 of the cam member 21 so as to retain the leg in locked position.

From the foregoing description the operation of my improved locking mechanism as shown in Figs. 1 to 5 will be readily understood. The lower section 16 of the leg 13 is rotated to move the upper end thereof away from the cam member 21 thus permitting the leg to swing from the vertical position shown in Figs. 3 and 4 to an inclined position with the upper end of the lower section 16 resting on the involute surface of the cam member.

Referring now to Figs. 6, 7 and 8 of the drawings, I show a modified form of lock. Secured to and extending rearwardly of the tripod, indicated generally at 10ᵃ, is a bracket 34 having a transverse opening 36 therethrough for receiving a bolt 37. The bracket 34 is provided with an involute shaped outer surface at the rear thereof, the lower portion of which has a reduced radius as at 38.

Mounted for pivotal movement about the bracket 34 and the bolt 37 is a U-shaped member or clevis 39. A longitudinally extending internally threaded sleeve portion 41 is provided in the clevis member 39 for receiving the externally threaded upper end of a tripod leg 42. The upper end of the leg 42 engages the involute shaped surface on the bracket 34 thereby supporting the tripod in a partly raised position. To adjust the tripod from this position the leg 42 is loosened relative to the involute surface and the lower end of the leg 42 moved downwardly and inwardly toward a vertical position. The leg 42 is then rotated so as to move the upper end thereof into engagement with the involute outer surface of the bracket 34 thus locking the leg in selected angular positions relative to the involute surface. The upper surface of the bracket 34 is substantially flat as at 43, whereby the end of the leg 42 may engage the same thus locking the leg in a vertical position.

From the foregoing it will be seen that I have devised an improved lock for the supporting legs of various devices. By providing a lock member which permits the leg to support the device in a partly raised position and also permits final adjustment to be made by merely moving the leg downwardly and inwardly toward a vertical position and then rotating the leg to lock the same in selected angular positions, the adjustment of the device is simplified greatly. Furthermore, more accurate adjustments are attained due to the fact that one does not have to loosen screws, nuts or the like and then support the device while the same is adjusted.

While I have shown the involute surfaces on the cam member 21 and the bracket 34 as extending more than 90°, it will be apparent to those skilled in the art that it may extend only a sufficient distance to permit locking of the leg in the desired angular positions relative to the cam surface. Also it will be understood that while I have shown only one leg of the tripod legs as having my improved locking device, more than one, or all, may be so provided.

While I have shown my invention in but two forms, it will be obvious to those skilled in the art that it is not so limited, but is susceptible of various changes and modifications without departing from the spirit thereof, and I desire, therefore, that only such limitation shall be placed thereupon as are specifically set forth in the appended claims.

What I claim is:

1. Locking mechanism for tripod legs and the like comprising an upper leg section having a transverse opening therethrough, a stationary cam member fitting slidably in said opening and having an involute surface thereon, there being an opening through said cam member substantially concentric with said transverse opening in said upper leg section, means extending through said opening in the cam member securing said cam member rigidly to the tripod, a longitudinally extending sleeve member on said upper leg section, having an opening therethrough which communicates with said transverse opening, a lower leg section having an upper end fitting in said longitudinally extending sleeve member and engaging the involute surface on the cam member whereby the leg is free to swing in a direction to move said upper end of the lower leg section toward a reducing radius on the cam member, and means holding said lower leg section in contact with said cam member at selected angular positions relative to the involute surface.

2. Locking mechanism as defined in claim 1 in which said means comprise external threads on the upper end of the lower leg section and internal threads on the longitudinally extending sleeve member for receiving the threaded upper end of the lower section.

3. A lock for tripod legs and the like comprising a stationary cam member on the tripod and having an involute outer surface, a U-shaped member having legs spaced apart a distance to receive said cam member, there being transverse openings through the legs of said U-shaped member and said cam member, a connecting member passing through said openings pivotally connecting said U-shaped member to said cam member, there being an opening in the base of said U-shaped member extending substantially parallel to the legs thereof, a tripod leg having an upper end disposed to fit in the opening in the base of said U-shaped member, means to adjust said tripod leg longitudinally with respect to said U-shaped member and position the upper end of said tripod leg in contact with said involute surface whereby the tripod leg is free to swing in a direction to move the upper end thereof toward a reducing radius on said cam member, said means holding the upper end of said tripod leg in contact with said cam member at selected angular positions relative to said involute surface.

4. In an adjustable supporting leg, a stationary cam member having an involute outer surface, a U-shaped member having legs spaced apart a distance to receive said cam member, there being transverse openings through the legs of the U-shaped member and said cam member, a connecting member passing through said openings pivotally connecting said U-shaped member to said cam member, a longitudinally extending sleeve member at the base of said U-shaped member, a leg having an upper end disposed to fit in the sleeve member, means to adjust said leg longitudinally with respect to said sleeve member and position the upper end of said leg in contact with said involute surface whereby the leg is free to swing in a direction to move the upper end thereof toward a reducing radius on said cam member, said means holding the upper end of said leg in contact with said cam member at selected angular positions relative to said involute surface.

5. An adjustable supporting leg as defined in claim 4 in which said means comprise external threads on the upper end of the leg and internal threads on the sleeve member for receiving the upper threaded end of the leg.

References Cited in the file of this patent

UNITED STATES PATENTS

| Number | Name | Date |
|---|---|---|
| 464,471 | Brown | Dec. 1, 1891 |
| 1,633,281 | Nielsen | June 21, 1927 |
| 1,780,039 | Pechan | Oct. 28, 1930 |
| 1,894,457 | Zerk | Jan. 17, 1933 |
| 1,919,554 | Howell | July 25, 1933 |
| 2,077,844 | Leighton | Apr. 20, 1937 |
| 2,293,559 | Patterson | Aug. 18, 1942 |
| 2,305,099 | Morris | Dec. 15, 1942 |
| 2,606,047 | Hill et al. | Aug. 5, 1952 |